United States Patent [19]
Andersson et al.

[11] 3,967,286
[45] June 29, 1976

[54] INK SUPPLY ARRANGEMENT FOR INK JET PRINTERS

[75] Inventors: Roger Ingemar Andersson, Angered; Stig Bertil Sultan, Floda, both of Sweden

[73] Assignee: Facit Aktiebolag, Atvidaberg, Sweden

[22] Filed: Dec. 26, 1974

[21] Appl. No.: 536,607

[30] Foreign Application Priority Data

Dec. 28, 1973 Sweden .............................. 7317525

[52] U.S. Cl. .............................................. 346/140 R
[51] Int. Cl.² .......................................... G01D 15/16
[58] Field of Search ..................................... 346/140

[56] References Cited

UNITED STATES PATENTS

| | | | |
|---|---|---|---|
| 1,335,125 | 3/1920 | Miller | 346/140 |
| 3,270,349 | 8/1966 | Murphy | 346/140 X |
| 3,708,798 | 1/1973 | Hildenbrand | 346/140 |
| 3,747,120 | 7/1973 | Stemme | 346/140 X |

*Primary Examiner*—Joseph W. Hartary
*Attorney, Agent, or Firm*—Alfred E. Miller

[57] ABSTRACT

An ink reservoir and supply arrangement associated with a printing head of an ink jet printer having means for filling the supply device automatically. The device is arranged to follow the movements of the printing head along an adjacent recording medium. A liquid filling member is adapted to transfer the liquid from the storing device to the supply device.

10 Claims, 3 Drawing Figures

INK SUPPLY ARRANGEMENT FOR INK JET PRINTERS

BACKGROUND OF THE INVENTION

In ink jet printer devices of the known type the ink is generally conveyed from a liquid storing vessel, such as a reservoir, to a printing head which moves adjacent to a printing medium by means of comparatively long flexible hoses. Since the printing head moves at a rather great speed which is subject to considerable accelerations and decelerations at the extreme end positions of the movement the liquid reservoir cannot have too great a quantity of liquid therein. Because of the prior art construction it is required that the liquid reservoir be refilled often.

The present invention relates to a device associated with an ink jet printer for supplying and storing the printing liquid.

SUMMARY OF THE INVENTION

A principal object of the present invention is to provide a structural arrangement which functions to fill the liquid reservoir automatically when required. The liquid reservoir is movably mounted to thereby follow the movements of the printing head.

It is another object of the present invention to provide an opening in the liquid reservoir which at least in one end position of the printing head co-acts with the liquid filling device.

It is a further object of the present invention to provide a reservoir for a printing head of an ink jet printer which is partly or totally filled with a liquid absorbing material.

The invention will now be more fully described with reference to the accompanying drawings, in which.

DESCRIPTION OF THE PREFERRED EMBODIMENTS

Figure 1:
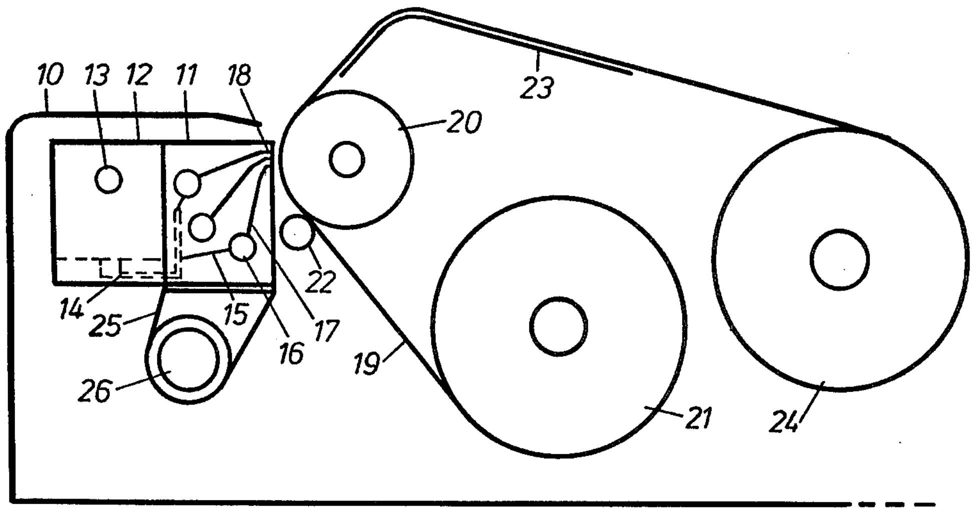
FIG. 1 is a diagrammatic view of an ink jet printer showing the device for storing and supplying liquid to the printing head in accordance with the teachings of the present invention.

An ink jet printer apparatus is shown in FIG. 1 having a housing 10 provided with a printing head 11. A liquid reservoir 12 is shown that is preferably integral with the printing head. The latter is adapted to move laterally relative to the paper 19 which is unwound from the supply roll 21. It should be observed that the liquid reservoir 12 has a fill opening 13. Furthermore, the liquid reservoir 12 communicates by means of channels 14 and 15 with the pump chambers located in the printing head. The pump chambers house piezoelectric crystals 16 which cause the pumping action. Communicating with the output of the pumping chambers are channels 17 which extend into respective capillary nozzles through which ink droplets are propelled on to a printing medium, for example, a paper tape 19 passing between a press roller 22 and a rotary roller 20. The paper 19 then proceeds through paper guide 23 and is wound on the take-up reel 24.

The printing head 11 is fixed to a support 25 which in turn is slidably mounted on a shaft 26. It should be apparent that the printing head of the present device can be moved along the roller 20 between two end positions by a driving device (not shown).

Figure 2:
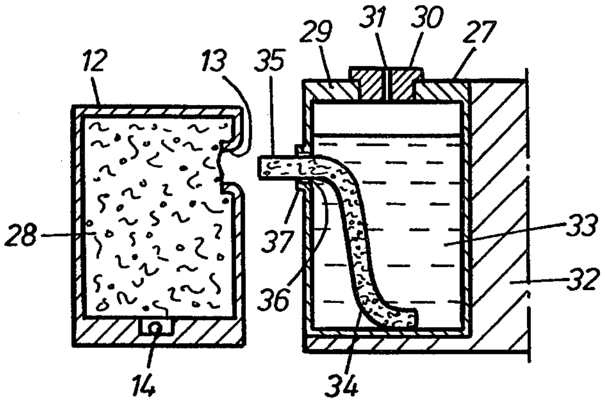
FIG. 2 is an enlarged sectional view of the device for storing and supplying liquid for the printing head and FIG. 3 is another embodiment of the reservoir with a filling device.

Referring now to FIG. 2 in which the reservoir 12 is shown together with an associated liquid filling device 27. The reservoir 12 is filled with a liquid absorbing material 28 which may comprise a porous material, for example, foam rubber or a foamed plastic, the pores of which form capillaries for the liquid. It will be noted that the filling device 27 is provided with a top fill opening 29 closed by a plug 30 having an air inlet opening 31. The device 27 can be attached to the support 32 which in turn is fixed to the ink jet printer apparatus.

The filling device 27 is provided with a quantity of liquid 33 into which a wick 34 is at least partially submerged. One end of the wick 35 passes through an opening 36 in a side wall of the filling device 27. A support ring 37 surrounds the opening 36.

The present liquid reservoir and supply arrangement operates as follows: When the reservoir 12 is in its operative position adjacent to the filling device 27, the exterior end 35 of the wick 34 passes into the fill opening 13 of the reservoir. If there is not sufficient liquid in the liquid absorbing material 28, the wick which has previously absorbed a considerable amount of liquid from the liquid present in the filling device 27, will deliver part of this liquid to the absorbing material 28. Of course, if the absorbing material 28 is already saturated with liquid there will not be any transfer of liquid to the reservoir. It will be apparent, therefore, that the liquid content of the reservoir 12 can be controlled automatically and maintained continually at a satisfactory level. Moreover, the filling device 27 can be of a sufficient size that it requires only infrequent refilling.

The reservoir 12 can also be fabricated without liquid absorbing material. In that condition the opening 13 of the reservoir 12 is of such a shape (not shown) that the end 35 of the wick 34 is compressed when it is forced into the opening 13 so that the liquid in the wick 34 is delivered to the reservoir.

Figure 3:
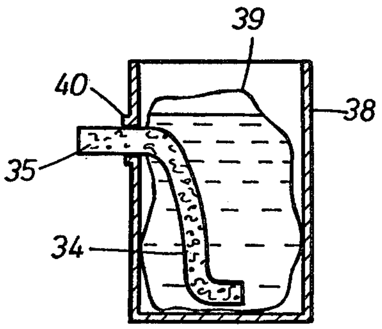

Furthermore, the filling device 27 may take another form in which the device can be easily and rapidly changed by using printing liquid in disposable packaging. As seen in FIG. 3 the device can only be in the form of a receptacle 38 into which a plastic bag 39 is inserted that contains the printing liquid. This package may be provided with a wick or the latter can be inserted through the bag after installation in the receptacle 38. It will be noted that the holder 38 is provided with an opening 40 which positions the end 35 of the wick 34 in a selected position to co-act with the opening 13 in the reservoir 12.

The present device has a construction and arrangement in which the printing liquid reservoir of an ink jet printer is automatically filled and thereby eliminates the troublesome manual refilling of the reservoir.

What is claimed is:

1. An ink jet printing device for recording medium comprising a printing head adapted to move back and forth along said recording medium and provided with a plurality of output nozzles through which ink droplets are propelled onto the recording medium to selectively form indicia thereon, a pumping chamber for each nozzle being in communication therewith, an ink reservoir, at least one channel connecting said ink reservoir with said pumping chambers, means mounting said ink reservoir for movement which follows the movement of said printing head, said reservoir continuously feeding the pump chambers with ink through said channel, and a fixed liquid supply device arranged to co-act with said reservoir in one or both end positions of said printing head in order to automatically refill said reservoir.

2. The combination as claimed in claim 1 further comprising a liquid absorbing material in said ink reservoir.

3. The combination as claimed in claim 2 wherein said liquid absorbing material fills said ink reservoir.

4. The combination as claimed in claim 2 wherein said liquid supply device comprises a wick that communicates with the liquid stored therein and co-acts with an opening in the ink reservoir.

5. The combination as claimed in claim 4 wherein said wick and said liquid absorbing material are constituted of a porous material, the pores of which form capillaries for the liquid.

6. The combination as claimed in claim 1 wherein said liquid supply device comprises a wick that communicates with the liquid stored therein and co-acts with an opening in the ink reservoir.

7. The combination as claimed in claim 6 wherein the end of said wick projects from said liquid supply device and is adapted to be inserted in said opening to deliver liquid to said reservoir.

8. The combination as claimed in claim 6 wherein said liquid supply device comprises a receptacle and a flexible disposable container therein, the latter being provided with the printing liquid for the printing head of said ink jet printer.

9. The combination as claimed in claim 8 further comprising a wick having one end projecting through a side wall of said disposable container.

10. The combination as claimed in claim 9 wherein said receptacle is provided with an opening through which the end of said wick protrudes, said receptacle functioning as a holder for said disposable container.

* * * * *